Patented May 5, 1942

2,281,735

UNITED STATES PATENT OFFICE 2,281,735

DUSTING COMPOSITION

Ferd W. Wieder, Berkeley, Calif., assignor to Stauffer Chemical Company, a corporation of California No Drawing. Application October 20, 1939, Serial No. 300,302

8 Claims. (Cl. 167—22)

This invention relates to dusting compositions, particularly those employed for the control of pests such as citrus thrips.

It has recently been discovered that antimonyl derivatives of aliphatic hydroxy acids, particularly tartar emetic, are useful in the control of citrus thrips. Antimonyls alone are not attractive to the thrips. However, if the antimonyl compound is closely associated with sweet material, the thrips, in partaking thereof. also partake of sufficient of the antimonyl compound to destroy themselves. It has been difficult heretofore to so incorporate tartar emetic, for example, with sugar, to secure effective control of the thrips. The previous difficulties I found can be overcome by impregnating or coating a dry carrier with a suitable sweet material. This is accomplished, for example, by dissolving ordinary sugar in water to provide a syrup and then mixing this with sufficient dry finely divided carrier material so that the sugar is uniformly distributed throughout the dry carrier and impregnates the carrier. Thereafter the antimonyl material is distributed throughout the sugar impregnated carrier.

As suitable carriers, one can use finely divided walnut shell flour, peach pit flour, apricot pit flour, talc, soap stone, wood flour, diatomaceous earth, pumice, bentonite, and like materials. The carrier material should be dry, free flowing, and sufficiently finely divided so that it can be dusted. When the sweet syrup is applied to the carrier, the latter is coated and impregnated with the syrup. "Impregnated" is employed as referring to both merely coated carriers and those in which the syrup is partially within the carrier.

Any one of the suitable sugars of sufficient sweetness can be employed, such as fructose, invert sugar, sucrose, glucose, or mixtures of these, or other materials such as molasses, and various sweet carbohydrate syrups, refined and unrefined. The sweet material as a syrup is mixed into the mass of dry carrier, sufficient carrier being employed to ensure that the final mass is dry and contains finally about 10% of the sweet material on a sucrose sweetness basis. Thereafter the antimonyl material is mixed in, in dry finely divided form.

I have mentioned the use of tartar emetic because this is the best known antimonyl. Any material containing the antimonyl group and, in place of the tartaric acid, any other aliphatic acid including an alpha hydroxy group such as glycollic, lactic, alpha hydroxy butyric, citric, malic and mucic acid, can be employed. In place of the potassium, one can use lithium, sodium, calcium, magnesium, zinc, as well as organic derivatives of ammonia such as alkyl amines aniline, simple heterocyclic organic nitrogen compounds and alkaloids, alkyl and sulfonium antimonyl derivatives of the alpha hydroxy aliphatic acids can be employed. In addition double salts can be used, such as calcium sodium, sodium lithium, calcium lithium, potassium lithium, zinc calcium, calcium zinc and calcium potassium antimonyl salts of the alpha hydroxy aliphatic acids.

The antimonyl compound is usually added in an equal weight to that of the sugar added, ordinarily about 10%, but both these percentages can be increased to as much as 25% with the carrier making up the difference. The dry antimonyl materials exert a conditioning effect on the impregnated or coated carrier, maintaining the carrier dry, free flowing and useful as a dusting insecticide.

If desired, and to ensure that the material remains dry, free flowing and otherwise suitable for dusting one can include a conditioner such as starch or a non-hygroscopic substantially water insoluble zinc compound can be added in finely divided form. Usually from 1% to 10% of the zinc compound suffices. The zinc compound is also useful on the vegetation as zinc is a required material.

As suitable non-hygroscopic, and substantially insoluble materials I mention metallic zinc in the form of zinc dust and compounds thereof including the oxide, hydroxide, carbonate, sulphide, sulphite, phosphate, pyrophosphate, stearate, cyanide, arsenate, oxalate, borate, and silicate of zinc, as well as organic zinc compounds as zinc cinnamate, zinc helionthate, various sulphonates of zinc as zinc phenol sulphonate and other organic zinc compounds.

The zinc carbonate, hydroxide, oxide, and sulphide are the most practical and, of these, basic zinc carbonate and the oxide made by the wet process are preferred since they are light and fluffy, as well as inexpensive, comparatively.

The term "light and fluffy" is used as expressive of the physical characteristics of materials most advantageously used in accordance with this invention. For example, a light and fluffy zinc oxide successfully used in accordance with this invention will weight about 30 pounds per cubic foot while a heavy zinc oxide of a pure and refined grade weighs 91 pounds per cubic foot. Similarly, under the Chancel test, the light and fluffy oxide had a value of about 98° Chancel while the pure and refined but heavy oxide had a value of 24° Chancel. The term "light and fluffy" is used as expressive of the material of low density and high Chancel test number as set forth.

I claim:

1. A method of manufacture of an insecticidal composition comprising impregnating a dry finely divided free flowing carrier with a sweet syrup to impregnate the carrier without destroying the dry free flowing character thereof and then depositing on the impregnated mass a dry finely divided tartar emetic.

2. A method of manufacture of an insecticidal composition comprising impregnating a dry finely divided free flowing carrier with a sweet syrup to impregnate the carrier without destroying the dry free flowing character thereof and then depositing on the impregnated mass a dry finely divided antimonyl salt of an aliphatic acid containing an alpha hydroxy group.

3. An insecticidal composition comprising as a major constituent a dry finely divided free flowing carrier material impregnated substantially homogeneously with sufficient of a sugar to render said material attractive to insects without impairing the free flowing character of the carrier, and, as a minor constituent in said composition, an antimonyl derivative of an aliphatic acid containing an alpha hydroxy group, said antimonyl being, deposited on said sugar impregnated carrier.

4. A composition as in claim 3 wherein the sugar and antimonyl each provide about 10% of the mass and the balance is carrier.

5. A composition as in claim 3 wherein the antimonyl is zinc antimonyl tartrate.

6. A composition as in claim 3 wherein the antimonyl is potassium antimonyl tartrate.

7. A composition as in claim 3 wherein a conditioner is incorporated to maintain the mass dry and free flowing.

8. A composition as in claim 3 where a light and fluffy zinc compound is incorporated as a conditioner to maintain the mass dry and free flowing.

FERD W. WIEDER.